Nov. 6, 1951   L. A. WELSH   2,574,232
COLLAPSIBLE GOLF BAG CARRIER
Filed May 9, 1950   2 SHEETS—SHEET 2

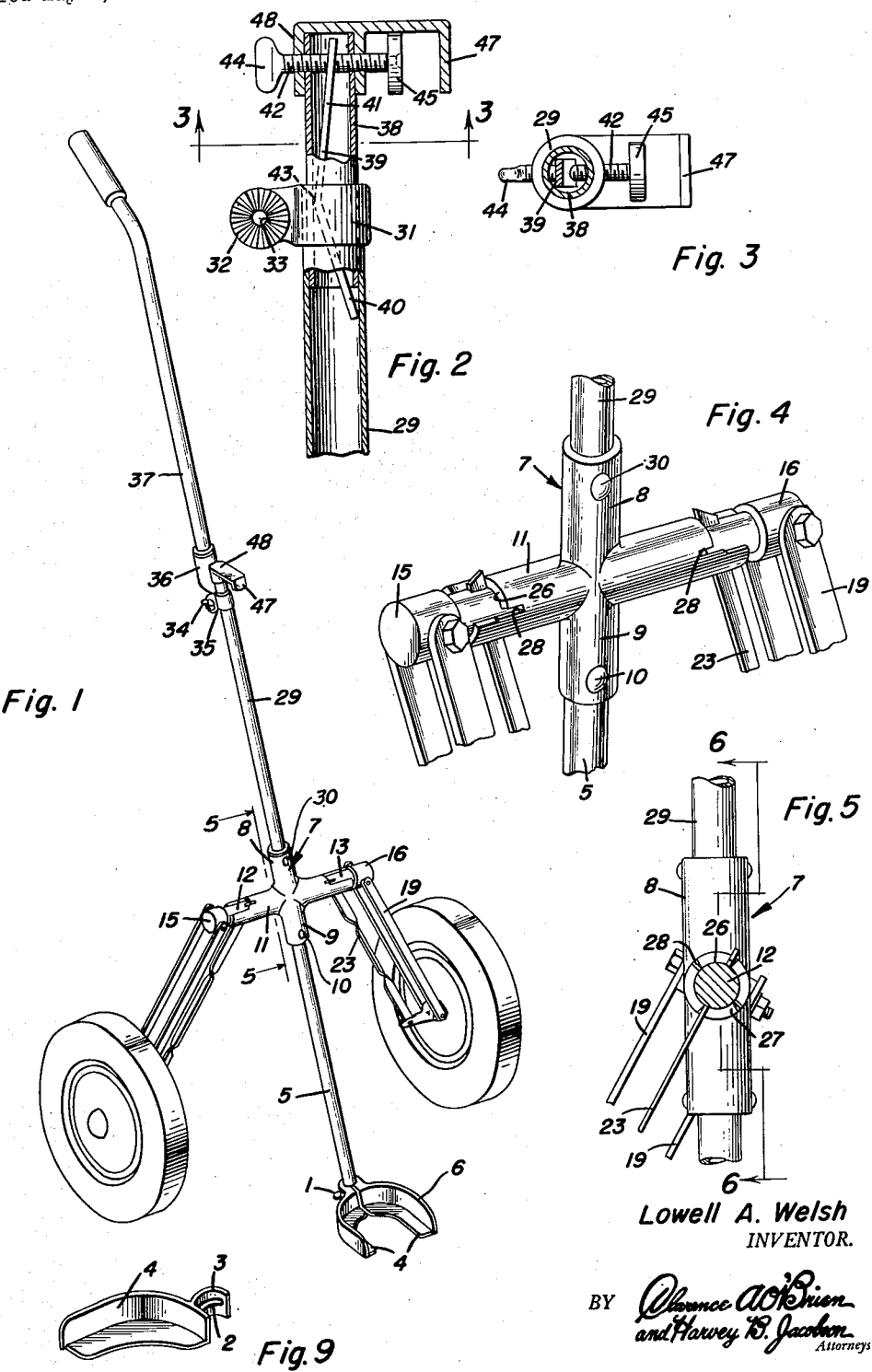

Lowell A. Welsh
INVENTOR.

BY Clarence A. O'Brien
and Harvey B. Jacobson
Attorneys

Patented Nov. 6, 1951

2,574,232

UNITED STATES PATENT OFFICE 2,574,232

COLLAPSIBLE GOLF BAG CARRIER

Lowell A. Welsh, Milford, Nebr.

Application May 9, 1950, Serial No. 160,880

6 Claims. (Cl. 280—42)

The present invention relates to new and useful improvements in golf bag carriers and more particularly to a collapsible cart for carrying a golf bag and which may be collapsed into a compact form when not in use.

An important object of the invention is to provide a collapsible handle and wheels for the cart whereby the handle may be folded upon itself and the wheels collapsed inwardly against the folded handle.

Another object is to provide a detachable clamp for holding the upper edge of a golf bag against the handle and embodying a novel double acting clamping construction for simultaneously clamping the golf bag and clamping the clamp to the handle by the action of a single clamping screw.

A further object is to provide a device of this character of simple and practical construction, which is strong and durable, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the cart in open position;

Figure 2 is an enlarged fragmentary vertical sectional view of the bag clamp;

Figure 3 is a sectional view taken on a line 3—3 of Figure 2;

Figure 4 is an enlarged fragmentary perspective view of the wheel locking mechanism;

Figure 5 is an enlarged vertical sectional view taken on a line 5—5 of Figure 1;

Figure 9 is an enlarged perspective view of one of the adjustable bag supporting arms.

Figure 6:
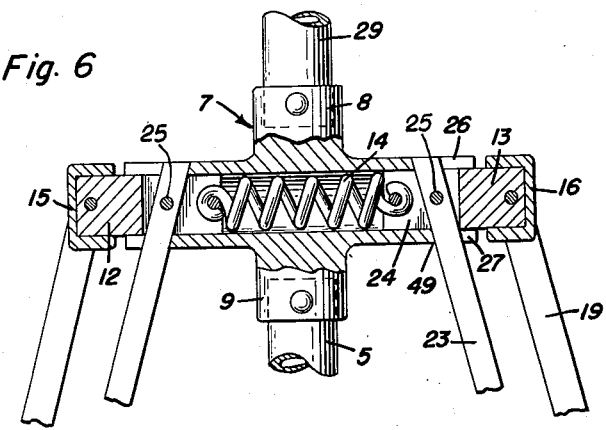
Figure 6 is a vertical sectional view taken on a line 6—6 of Figure 5.

Referring now to the drawings in detail, wherein for the purpose of illustration I have disclosed a preferred embodiment of my invention, the numeral 5 designates a lower golf bag support having a holder 6 at its lower end for supporting the lower end of a golf bag (not shown). Holder 6 is constructed of a pair of arcuate flanged arms 4, each having an arcuate attaching plate 3 at its rear end and provided with a slot 2 receiving a fastener 1 to secure the arms to support 5 in inwardly and outwardly swingably adjusted position to accommodate bags of different sizes.

A connector 7 is formed with upper and lower sockets 8 and 9, the support 5 being secured to lower socket 9 by rivets or the like 10 and tubular arms 11 project outwardly from the opposite sides of the center of the connector 7. Plugs or slides 12 and 13 are rotatably and slidably mounted in the ends of arms 11 and are connected to each other by a coil spring 14 holding the plugs inwardly.

Caps 15 and 16 are secured to the outer ends of the plugs by means of transverse bolts 17 and nuts 18 and to the ends of each of the bolts a pair of spaced parallel arms 19 are pivotally connected at their upper ends while the lower ends of the arms 19 are pivoted to bolts 20 positioned transversely in axles 21 on the outer ends of which wheels 22 are journaled.

Levers 23 are pivoted at their lower ends to the inner ends of axles 21 and are also pivoted at their upper ends in vertical slots 24 at the inner ends of plugs 12 and 13 by transverse pins 25 to project the upper ends of the levers about the plugs. The levers 23 also project upwardly through upper and lower notches 26 and 27 in the outer edges of arms 11. Locking slots 28 extend inwardly from upper notches 26 to receive the upper ends of the levers when the plugs are rotated to aline the levers therewith to lock arms 19 with their lower ends in an outwardly inclined position, as shown in Figures 1 and 6, the arms being held in that position by spring 14 pulling the plugs inwardly.

A tubular lower fixed handle 29 is secured at its lower end in upper socket 8 by a rivet 30 and a collar 31 is welded or otherwise secured on the upper end of lower handle 29. A serrated disk 32 projects in an edgewise position from the rear of collar 31 and is formed with a central opening 33 for receiving a bolt and wing nut 34 to lock a second serrated disk 35 in confronting rotatably adjusted position against disk 32. Disk 35 is formed at the lower end of a socket 36 in which an upper folding handle 37 is secured.

A tube 38 is vertically adjustable in the upper end of fixed handle 29 and is held in vertically adjusted position by a V-shaped leaf spring 39 positioned in tube 38 and having its lower end 40 bearing against the inside of handle 29 and having its upper end 41 threadedly receiving a clamping screw 42 threaded transversely in the upper end of the tube. The central portion 43 of spring 39 rocks against the inside of tube 38.

One end of screw 42 is formed with a wing head 44 and a clamping head 45 is swivelly connected to the other end of the screw in opposed relation to a fixed jaw 47 secured to the upper end of tube 38 by means of a socket 48 fitted over the tube and through which screw 42 also feeds.

In the operation of the device, a golf bag (not shown) rests on lower support or holder 6 and the upper edge of the bag is clamped between jaw 47 and clamping head 45. Clamping jaw 47 and clamping head 45 are raised and lowered in handle 29 to adjust the clamp in accordance with the height of the bag by backing out screw 42 which feeds the upper end 41 of spring 39 forwardly to release tension at its lower end 40 against handle 29 and the tube 39 is then free to slide in the handle. A forward clamping movement of screw 42 will clamp the bag between jaw 47 and head 45 and the continued turning movement of the screw will move upper end 41 of spring 39 rearwardly to place lower end 40 of the spring under tension against handle 29 to hold the clamp in its vertically adjusted position.

Figure 7:
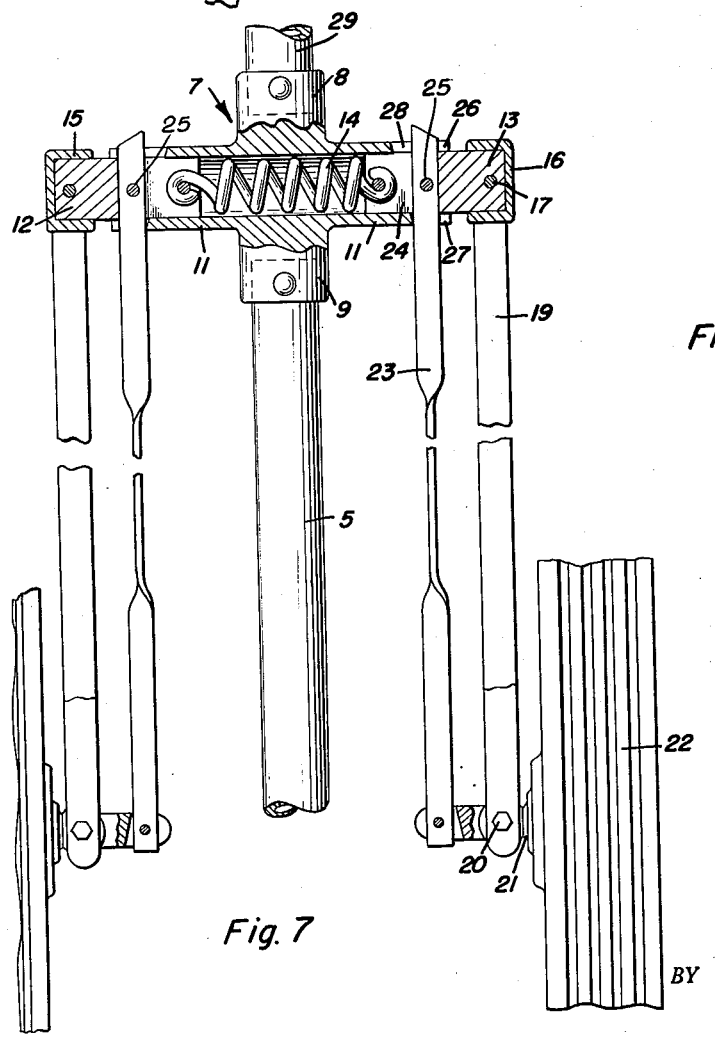
Figure 7 is a similar view showing the wheels in collapsed position.
Figure 8:
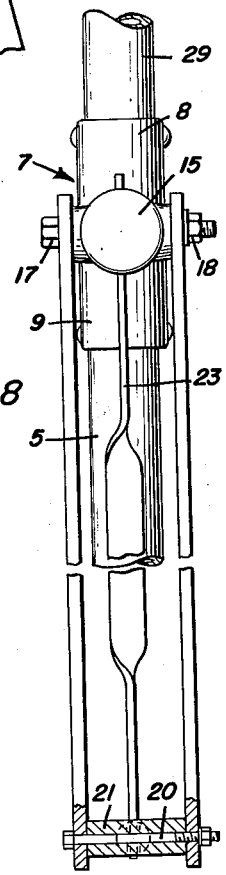
Figure 8 is a side elevational view of the wheel locking mechanism in collapsed position and with parts shown in section.

Plugs or slides 12 and 13 are rotated in arm 11 to swing lower ends of arms 19, levers 23 and wheels 22 forwardly with respect to handle 5 and to swing upper end of levers 23 into position for entering locking slots 28 by spring 14, as shown in Figure 6, the levers being fulcrumed at edge 49 of lower notches 27 to swing the lower ends of the levers outwardly and thus swing arms 19, axles 21 and wheels 22 outwardly away from handle 5 to reduce danger of tilting of the carrier, the levers 23 being locked in slots 28 by spring 14 to thus support handle 5 and the golf bag carried thereby in a rearwardly tilted position when suport 6 rests on the ground. To swing wheels 22 inwardly, levers 22 and arms 19 are swung inwardly at their lower ends to release the levers from slots 28 and plugs or slides 12 and 13 are then rotated to engage the levers with notches 26 to hold the levers and arms in their folded inward positions substantially parallel to handle 5, as shown in Figure 7.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described as preferred embodiment of the invention the same is susceptible to certain changes fully comprehended by the spirit of the invention as herein described and the scope of the appended claims.

Having described the invention, what is claimed as new is:

1. In a golf bag cart, the combination of a handle adapted for supporting a golf bag, a horizontal support on the handle, means slidably carried at the ends of the horizontal support, wheel supporting arms pivotally carried by said first named means for swinging inwardly and outwardly at opposite sides of the handle, spring means connected to said first named means holding the arms outwardly, and means locking said first named means with the arms held in either an inward or outward position.

2. In a golf bag cart, the combination of a handle adapted for supporting a golf bag, a horizontal support on the handle, slides carried at the ends of the horizontal support, wheel supporting arms pivotally connected at one end to said slides for swinging inwardly and outwardly at opposite sides of the handle, spring means sliding the slides inwardly, and levers connected at one end to the slides and connected at their other ends to the other ends of the arms and rockable against the outer ends of said horizontal support to swing the arms outwardly upon an inward movement of the slides.

3. In a golf bag cart, the combination of a handle adapted for supporting a golf bag, a horizontal support on the handle, slides carried at the ends of the horizontal support, wheel supporting arms pivotally connected at one end to said slides for swinging inwardly and outwardly at opposite sides of the handle, spring means sliding the slides inwardly, and levers connected at one end to the slides and connected at their other ends to the other ends of the arms and rockable against the outer ends of said horizontal support to swing the arms outwardly upon an inward movement of the slides, said levers having interlocking engagement with the horizontal support to hold the arms in their inward position.

4. In a golf bag cart, the combination of a handle adapted for supporting a golf bag, a horizontal tubular support carried by the handle, slides rotatably and slidably carried at the ends of the support, wheel supporting arms pivotally connected at one end to said slides for swinging into and out of folded position at opposite sides of the handle, stub axles pivoted to the other ends of the arms, spring means holding the slides inwardly, and levers pivoted at one end to the slides inwardly of the arms and pivoted at their other ends to the inner ends of the axles, said levers being fulcrumed at the ends of the horizontal support to swing the arms outwardly upon an inward movement of the slides.

5. In a golf bag cart, the combination of a handle adapted for supporting a golf bag, a horizontal tubular support carried by the handle, slides rotatably and slidably carried at the ends of the support, wheel supporting arms pivotally connected at one end to said slides for swinging into and out of folded position at opposite sides of the handle, stub axles pivoted to the other ends of the arms, spring means holding the slides inwardly, and levers pivoted at one end to the slides inwardly of the arms and pivoted at their other ends to the inner ends of the axles, said levers being fulcrumed at the ends of the horizontal support to swing the arms outwardly upon an inward movement of the slides, and interlocking means between the levers and the horizontal support holding the arms in outward position.

6. In a golf bag cart, the combination of a handle adapted for supporting a golf bag, a horizontal tubular support carried by the handle, slides rotatably and slidably carried at the ends of the support, wheel supporting arms pivotally connected at one end to said slides for swinging into and out of folded position at opposite sides of the handle, stub axles pivoted to the other ends of the arms, spring means holding the slides inwardly, and levers pivoted at one end to the slides inwardly of the arms and pivoted at their other ends to the inner ends of the axles, said levers being fulcrumed at the ends of the horizontal support to swing the arms outwardly upon an inward movement of the slides, and stepped notches at each end of the horizontal support lockably receiving the adjacent ends of the levers at selective depths in the notches upon a rotary movement of the slides to hold the arms inwardly or outwardly.

LOWELL A. WELSH.

REFERENCES CITED

The following references are of record in the file of this patent:

UNITED STATES PATENTS

| Number | Name | Date |
|---|---|---|
| 2,007,709 | Eppens | July 9, 1935 |
| 2,275,297 | Hearnshaw | Mar. 3, 1942 |
| 2,443,847 | Williamson | June 22, 1948 |
| 2,523,893 | Williamson | Sept. 26, 1950 |